M. VON RECKLINGHAUSEN.
APPARATUS FOR STERILIZING LIQUIDS BY MEANS OF ULTRA-VIOLET RAYS.
APPLICATION FILED MAR. 9, 1912.
1,204,721.
Patented Nov. 14, 1916.
2 SHEETS—SHEET 1.
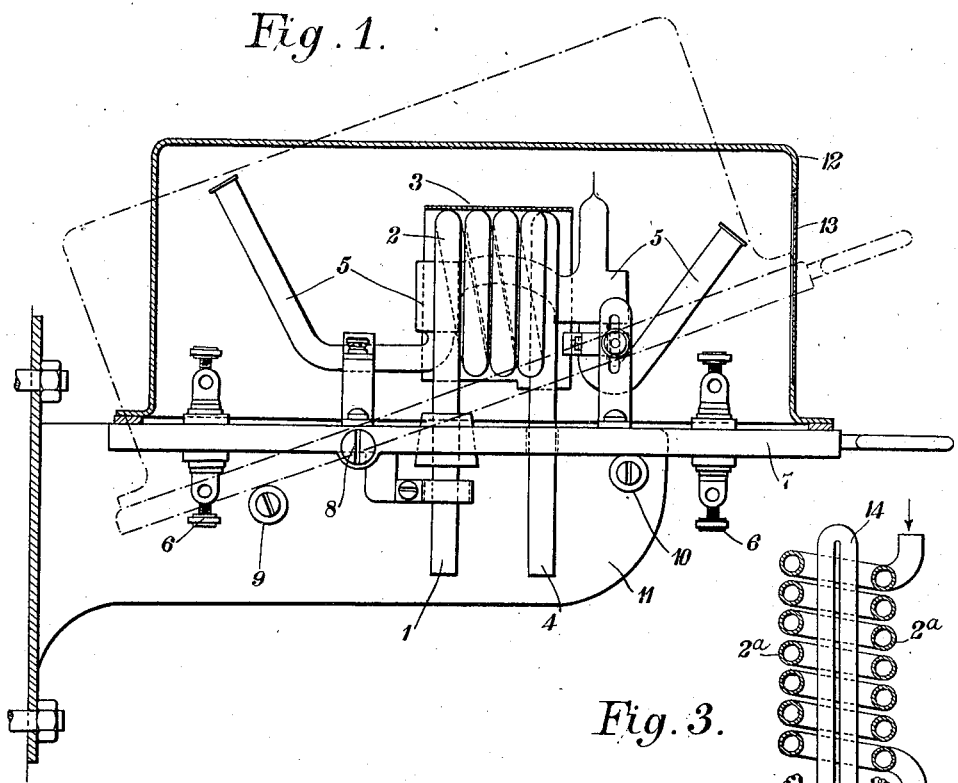
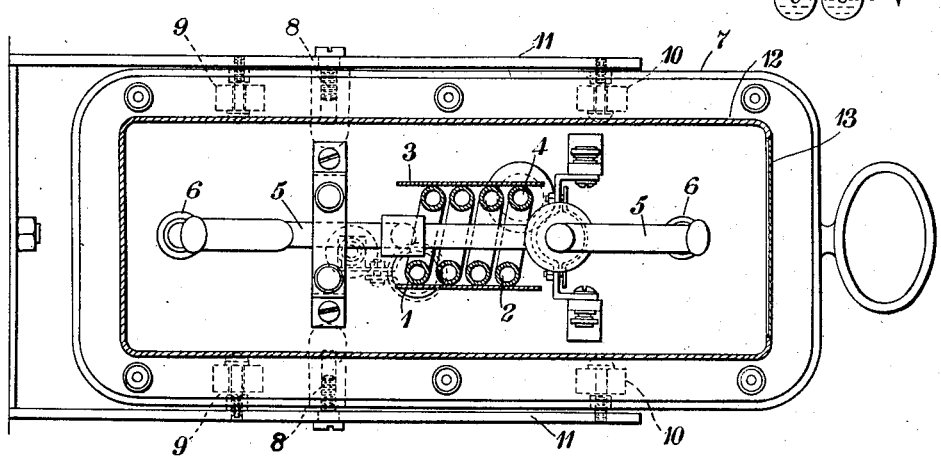
WITNESSES:
William Johnson
Wm Bohleber
INVENTOR:
Max von Recklinghausen
By
Kerr Page Cooper & Hayward.
attys

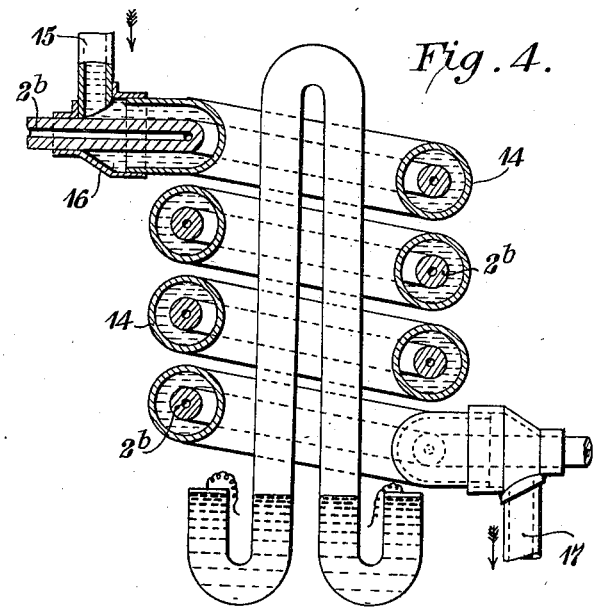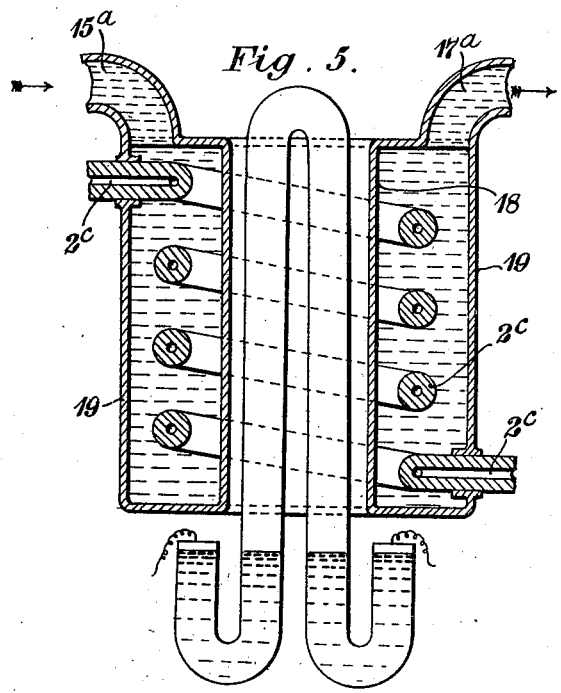

UNITED STATES PATENT OFFICE.

MAX VON RECKLINGHAUSEN, OF PARIS, FRANCE, ASSIGNOR, BY MESNE ASSIGNMENTS, TO THE R. U. V. COMPANY, INC., A CORPORATION OF NEW YORK.

APPARATUS FOR STERILIZING LIQUIDS BY MEANS OF ULTRA-VIOLET RAYS.

1,204,721.     Specification of Letters Patent.     Patented Nov. 14, 1916.

Application filed March 9, 1912. Serial No. 682,719.

*To all whom it may concern:*

Be it known that I, MAX VON RECKLINGHAUSEN, a subject of the Emperor of Germany, residing at Paris, France, have invented a new and useful Improvement in Apparatus for Sterilizing Liquids by Means of Ultra-Violet Rays, of which the following is a specification.

The invention relates to apparatus for the purpose of sterilizing liquids by means of ultra-violet rays and has for its object to construct devices of this kind which will offer little impediment to the passage of the liquid to be treated and which shall be of great utility with a relatively low cost and high efficiency.

It is known that ultra-violet rays which traverse a certain thickness of air or other gases are absorbed to such an extent that an apparatus in which there exists a thick layer of air between the source of rays and the liquid to be treated will have a considerably reduced efficiency. In order to prevent this diminution of the efficiency of the apparatus the liquid should be caused to pass as close as possible to the rays emanating from the source and the speed of flow of the liquid ought to be such that each liquid particle remains submitted to the action of the rays for sufficient time to insure its sterilization.

According to the present invention I construct an apparatus which conforms to the above conditions and comprises a source of ultra-violet rays, a mercury lamp with a quartz container for example, surrounded by a spiral tube formed of quartz or other material which is permeable to the ultra-violet rays. The liquid to be sterilized is passed through the spiral tube at a suitable speed and consequently is traversed in a continuous manner by the ultra-violet rays during its passage from one extremity of the spiral tube to the other. The spiral tube is furnished with suitable inlet and outlet tubes by means of which the liquid can enter the spiral and leave it after being sterilized.

In the accompanying drawings Figure 1 is an elevation showing one form of the apparatus, and Fig. 2 is a plan of the same. Figs. 3, 4 and 5 are elevations partly sectional illustrating modifications.

Referring now to Figs. 1 and 2 a mercury vapor lamp 5 forms the source of ultra-violet rays and receives current by the terminals 6, said lamp is mounted on a base 7 which can oscillate about the pivot 8 and can be inclined or tilted for the purpose of starting the lamp. The base 7 is limited in its movement by two stops 9 and under normal conditions rests on two stops 10. The stops 9 and 10 also the pivot 8 are carried by two vertical brackets 11. The liquid to be treated passes through a spiral tube 2 the dimensions of which are such as will permit the lamp to be inserted and withdrawn at will, said tube being provided with a suitable inlet 1 and outlet 4 which may be furnished with flexible connections permitting the inclination of the lamp when starting the same. The spiral tube is surrounded on the outside with an envelop 3, the face of which is reflecting and the output of the apparatus is thereby considerably increased. The whole apparatus may be inclosed in a box 12 for the purpose of preventing the rays emitted by the lamp from spreading to the outside and in order to permit the operation of the apparatus to be watched one of the sides of the box is furnished with a suitable window 13, fitted with glass or some other material which is opaque to ultra-violet rays.

The operation of the apparatus is as follows:—The mercury vapor lamp 5 having been started by tilting the apparatus upon the pivot 8 and then returning it to its normal condition the liquid to be sterilized is forced to enter by pipe 1. The liquid passes through the spiral tube 2 and flows out by the pipe 4. During its passage the liquid is subjected to the action of direct rays falling on the internal surface of the spiral tube and rays reflected by the surface 3 which fall on the exterior part of the spiral.

The apparatus forming the object of the invention is specially applicable to the sterilization of water or other liquids which are very permeable to ultra-violet rays, but it can also be used for other liquids since by suitably regulating the passage of the liquid through the spiral tube eddies can be set up in the liquid, which cause all the liquid particles to pass successively into contact with the internal surface of the spiral tube thereby subjecting them to the sterilizing action of the rays emitted by the mercury lamp or other source.

In Fig. 3 of the drawings the spiral tube $2^a$ in place of being arranged with its axis horizontal is vertical and the quartz mercury vapor lamp 5ª is made with an inverted U-shaped vertical limb 14 passing inside the spiral tube. The liquid to be sterilized enters the spiral tube at the top and leaves the same at the bottom, and by this arrangement it will be clear that when the operation is stopped the spiral becomes entirely empty of liquid. This is not the case with the arrangement shown in Figs. 1 and 2 in which liquid sometimes remains in the lower portions of the spiral tube and since the liquid cannot be passed into the spiral tube when the lamp is first started the liquid remaining over from the last operation sometimes evaporates and the lime or other salts contained therein have a bad effect on the quartz causing it to become opaque. This disadvantage is obviously not present with the arrangement shown in Fig. 3.

For the treatment of liquids which are opaque or nearly opaque to ultra-violet rays, milk for example, the arrangement shown in Fig. 4 may be employed. The spiral tube $2^b$ has a capillary bore through which the liquid under pressure is forced and in order to prevent the temperature of the liquid from being raised this capillary tube is surrounded by a concentric tube 14, through which the cooling water is forced to circulate. The cooling water is led in by the tube 15, which enters a socket 16 making tight joints with the capillary tube $2^b$ and outer tube 14, as shown at the top of the figure, and leaves by an outlet tube 17 arranged in a similar manner. The water being transparent to ultra-violet rays will not interfere with the passage of the rays to the liquid to be treated.

In Fig. 5 a modification is shown in which the cooling water jacket consists of two cylinders 18, 19, forming an annular passage in which the spiral tube $2^c$ is located, the circulation of cooling water being maintained by the inlet and outlet tubes $15^a$, $17^a$, so as to effectually cool the spiral tube $2^c$ and contents.

The concentric tubes $2^b$, 14 in Fig. 4, and the tube $2^c$ and cylinder 18 in Fig. 5 must of course be made of material such as quartz which is permeable to ultra-violet rays.

It is very apparent that while I have referred to the tube for conveying the liquid to be sterilized as being spiral it is obvious that I do not confine my invention to this specific construction, but reserve the right to extend the same to cover all equivalent constructions. It will also be understood that various modifications may be made in the devices herein described without exceeding the spirit and scope of my invention and I desire that only such limitations shall be imposed as are indicated within the appended claims.

I claim as my invention.

1. The combination with a source of ultra-violet rays of a complete or closed spiral tube formed of material permeable to said rays, surrounding said source, and inlet and outlet tubes by which liquid may enter and leave the spiral tube.

2. The combination of a mercury vapor lamp having an inverted U-shaped container forming a source of ultra-violet rays, a complete or closed spiral tube formed of material permeable to said rays surrounding said container, and inlet and outlet tubes by which liquid may enter and leave the spiral tube.

3. The combination of a mercury vapor lamp having a container of quartz, a complete or closed spiral tube of quartz surrounding said container, and inlet and outlet tubes by which liquid may enter and leave the spiral tube.

4. The combination of a source of ultra-violet rays, a complete or closed spiral tube formed of material permeable to said rays surrounding said source, and a water jacket surrounding said spiral tube for the purpose of cooling the same.

5. The combination of a source of ultra-violet rays, a complete or closed spiral capillary tube formed of material permeable to said rays surrounding said source, and means for forcing a liquid through the spiral tube.

In testimony whereof I have hereunto subscribed my name this twenty-seventh day of February 1912.

MAX von RECKLINGHAUSEN.

Witnesses:
  GEORGE E. LIGHT,
  LUCIEN MEMMINGER.